United States Patent [19]

Shirakawa et al.

[11] Patent Number: 4,774,622

[45] Date of Patent: Sep. 27, 1988

[54] CONNECTING APPARATUS FOR LIGHTNING ARRESTERS FOR OVERHEAD TRANSMISSION LINES

[75] Inventors: Shingo Shirakawa; Shigeo Kikuchi, both of Hitachi, Japan

[73] Assignee: Hitachi, Ltd., Tokyo, Japan

[21] Appl. No.: 106,869

[22] Filed: Oct. 13, 1987

[30] Foreign Application Priority Data

Oct. 13, 1986 [JP] Japan .............................. 61-241334

[51] Int. Cl.[4] .......................... H02H 9/04; H01T 4/00

[52] U.S. Cl. .................................... 361/132; 361/124; 361/117; 337/34; 174/43

[58] Field of Search .................... 174/5, 5 SG, 40, 42, 174/43, 45, 150; 337/168, 180, 181, 28, 30, 31, 34; 361/38–41, 117, 124, 125, 131, 132, 136, 137, 107

[56] References Cited

U.S. PATENT DOCUMENTS 2,200,496 5/1940 Fox .................................... 337/180
2,319,161 5/1943 Schultz .............................. 337/181
2,639,346 5/1953 Yonkers .............................. 337/31
2,871,313 1/1959 Chabala et al. ..................... 361/124
3,249,815 5/1966 Henry ................................ 361/125
4,308,566 12/1981 Imataki et al. ..................... 361/124

FOREIGN PATENT DOCUMENTS 124241 9/1979 Japan ................................ 361/124

*Primary Examiner*—A. D. Pellinen
*Assistant Examiner*—H. L. Williams
*Attorney, Agent, or Firm*—Antonelli, Terry & Wands

[57] ABSTRACT

A connecting apparatus includes a connecting conductor for connecting a supporting insulator supporting an overhead transmission line and a lightning arrester through a disconnecting member. The connecting conductor includes at least first and second conductor segments having given lengths. The first conductor segment connected to the lightning arrester is greater in bending strength than the second conductor segment connected to the disconnecting member.

9 Claims, 4 Drawing Sheets

CONNECTING APPARATUS FOR LIGHTNING ARRESTERS FOR OVERHEAD TRANSMISSION LINES

BACKGROUND OF THE INVENTION

The present invention relates to a connecting apparatus for a lightning arrester mounted on a tower supporting overhead transmission lines.

It has been the usual practice in the past that an overhead transmission line including one or plurality of circuits is supported at one end of a suspension insulator (supporting insulator) attached at its other end to one arm of each steel tower, thereby forming a transmission system. In this type of transmission system, when lightning strikes the tower or the overhead ground wire or the overhead transmission line at the top of the tower, a short-circuit is established between the arcing horns provided at the ends of the supporting insulator thereby causing an instantaneous voltage drop and simultaneous grounding of the plurality of the circuits. Such voltage drop and simultaneous grounding cause an instaneous service interruption of the transmission system with the resulting great effect in a wide range of fields, e.g., electronic apparatus which have recently come into general use. Thus, with a view to preventing any effects due to a lightning strike on a transmission system, proposals have recently been made in which a lightning arrester employing a nonlinear resistor is arranged in parallel to a supporting insulator on each steel tower supporting an overhead transmission line. (See Japanese Unexamined Publications Nos. 60-5736 and 60-32267).

As mentioned above, the lightning arrester is arranged, along with the supporting insulator, on the steel tower and the lightning arrester is connected through a connecting conductor to the end of the supporting insulator at which the overhead transmission is fixed. In this case, the connecting conductor of a small wire-diameter is used in consideration of possible disconnection due to the melting of the connecting conductor. At this time, in the case of the ordinary direct ground system the single-line ground current is on the order of several hundreds amperes and therefore it is necessary to use the connecting conductor of 0.5 to 2 mm in diameter. However, this diameter results in an increased electric field and thus there is the danger of causing radio interference. On the contrary, if the connecting conductor of about 10 mm in diameter is used, disconnecting means is used to separate the lightning arrester from the supporting insulator as occasion demands.

When the connection provided by the connecting conductor between the lightning arrester and the supporting insulator is disconnected by the disconnecting means, the disconnected connecting conductor hangs down so that one end of the connecting conductor disconnected by the disconnecting means is caused by wind to swing to approach the changed portion of the supporting insulator and there is the possibility of this approach causing a reflashover.

SUMMARY OF THE INVENTION

It is an object of this invention to provide an improved connecting apparatus for an overhead transmission line lightning arrester, which is capable of preventing the occurrence of a reflashover after the disconnection of a connecting conductor.

To accomplish the object of the invention, in accordance with the invention there is thus provided a connecting apparatus for an overhead transmission line lightning arrester including a connecting conductor for interconnecting through disconnecting means a supporting insulator for supporting an overhead transmission line and a lightning arrester arranged in parallel with the supporting insulator, the connecting conductor being divided into at least two conductor segments having given lengths and connected in series with each other, the conductor segment connected to the lightning arrester being greater in bending strength than the conductor segment connected to the supporting insulator.

When lightning occurs so that the disconnecting means comes into operation and the connecting conductor is disconnected and left on the lightning arrester side, the necessary insulation distance between the transmission line and the disconnected end of the connecting conductor is ensured thereby preventing the occurrence of reflashover which might be caused as a result of the connecting conductor approaching the supporting insulator supporting the transmission line.

DESCRIPTION OF THE PREFERRED EMBODIMENTS

A connecting apparatus for an overhead transmission line lightning arrester according to the invention will now be described in due course with reference to the illustrated embodiments.

Figure 1:
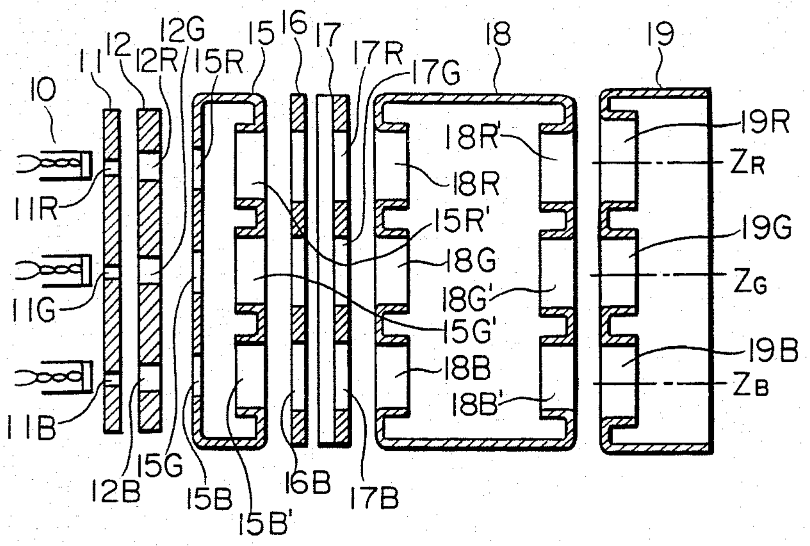
FIG. 1 is a schematic diagram showing the construction of a connecting apparatus for an overhead transmission line lightning arrester according to an embodiment of the invention.

In a transmission system, as shown in FIG. 1, a supporting insulator 2 is attached to the lower surface of an arm 1A of a steel tower 1 and an overhead transmission line 3 is supported by a fixture 4 on the lower portion of the other end of the supporting insulator 2. Also, a lightning arrester 5 is attached to the arm 1A in parallel with the supporting insulator 2 at a given distance therefrom.

A connecting plate 6 is fastened to the lower end of the supporting insulator 2, and a connecting conductor 7 having its one end fastened to the lightning arrester 5 is connected to the connecting plate 6 through disconnecting means 8. The disconnecting means 8 includes, for example, means employing a metal or powder which is melted or exploded by the current flowing in the connecting conductor 7.

Figure 2:
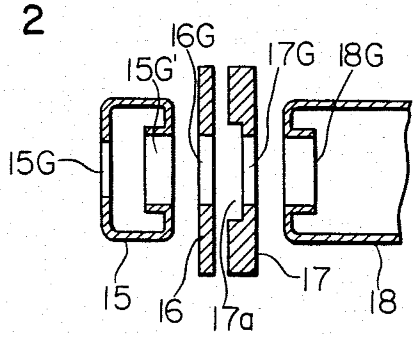
FIG. 2 is a partial enlarged view of FIG. 1.

In the first embodiment, the connecting conductor 7 connecting the lower end of the supporting insulator 2 and the lightning arrester 5 juxtaposed with the former, includes conductor segments 7A and 7B having given lengths and connected in series with each other. In other words, the connecting conductor 7 is constructed as shown in detail in FIG. 2. The conductor segment 7A connected to the lightning arrester 5 and made of a thick wire rod having a bending rigidity and the conductor segment 7B connected to the supporting insulator 2 and made of a thin wire rod having a small bending rigidity are connected in series through a metal connector 7C. The conductor segment 7A is fastened to the lower end of the lightning arrester 5 by a metal fixture 9 and the other conductor segment 7B is connected to the connecting plate 6 through the disconnecting means 8.

With the connection construction described above, when the disconnecting means 8 comes into operation, the connecting conductor 7 is disconnected with the supporting insulator 7 and it hangs downwardly of the lightning arrester 5 as shown by the broken line. In this condition, when a transverse external force such as strong wind is applied to the connecting conductor 7, the conductor segment 7A is not practically bent due to its large bending strength and only the conductor segment 7B of the small bending strength is caused to swing as shown by the dash-and-dot line. Even in this case, an insulation distance L is ensured which is sufficient to prevent any possible flashover between the charged portion of the supporting insulator 2 supporting the overhead transmission line 3. Therefore, it is possible to prevent any ill effect on the transmission system due to the hanging connecting conductor 7 and hence it is possible to enhance the insulation reliability of the transmission system.

Figure 6A:
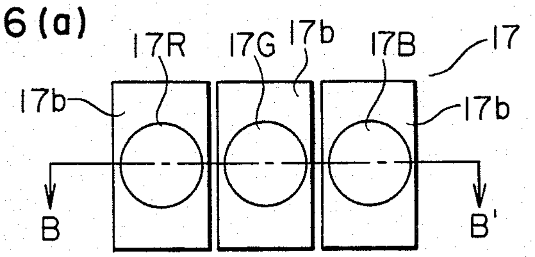
Figure 6B:
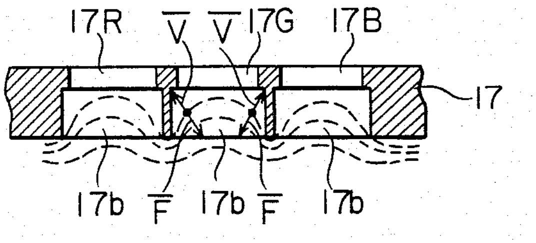
Figure 7:
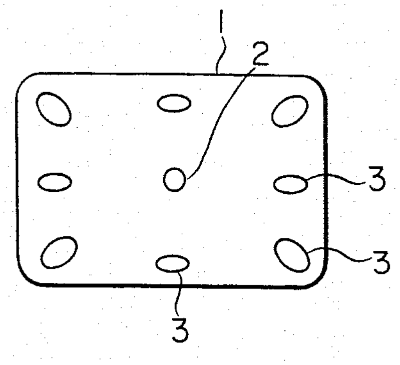
FIG. 7 PRIOR ART
Figure 8:
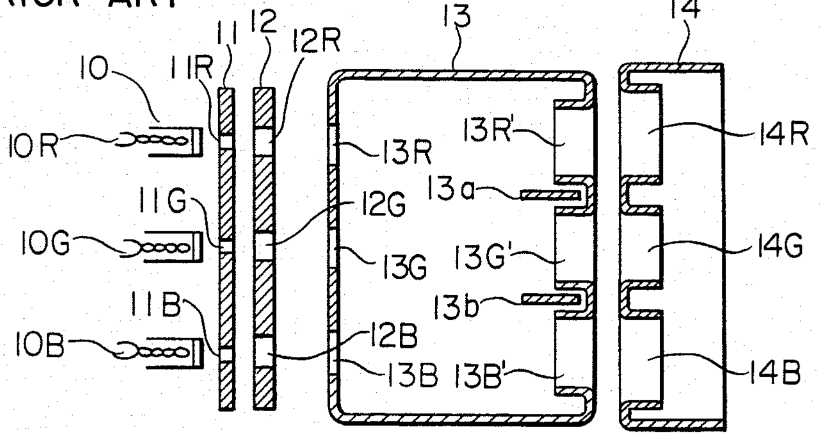
FIG. 8 PRIOR ART
Figure 9:
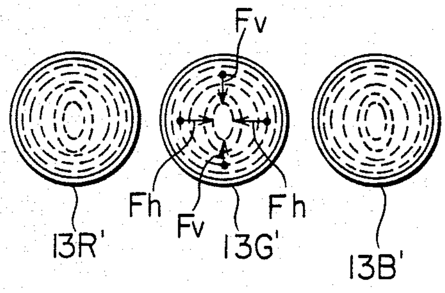
FIG. 9 PRIOR ART
Figure 10:
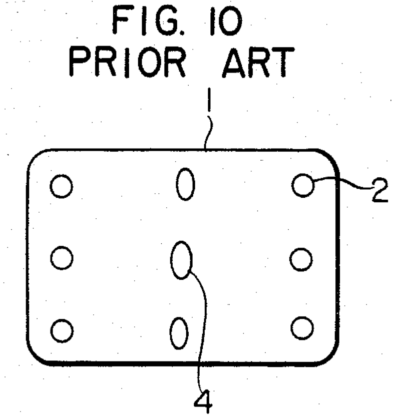
FIG. 10 PRIOR ART

The lengths of the conductor segments 7A and 7B forming the connecting conductor 7 are preselected such that when the connecting conductor 7 is disconnected from the supporting insulator 2 to hang down as shown by the broken line thus causing the conductor segment 7B to describe an arc as shown in the Figure, the occurrence of any flashover between the conductor segment 7B and the changed portion of the supporting insulator 2 is prevented. Also, the same effect can be attained by dividing the connecting conductor 7 into three conductor segments 7A, 7B and 7D which are connected in series through connectors 7C and 7E as shown in FIG. 6.

Figure 3:
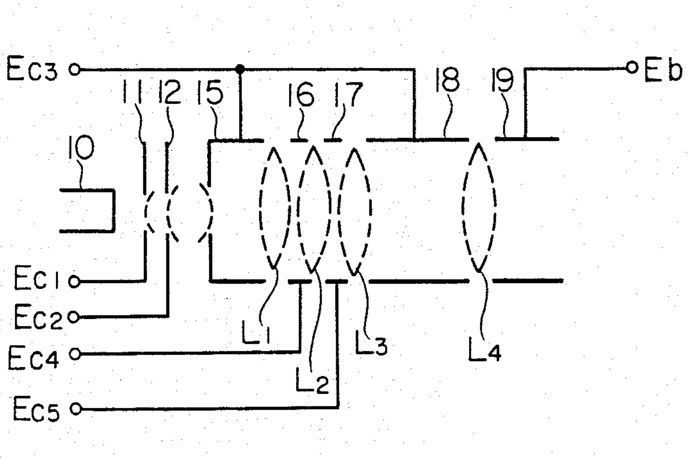
FIGS. 3 to 6 are partial enlarged views showing connecting apparatus for overhead transmission line lightning arresters according to other embodiments of the invention.
Figure 4A:
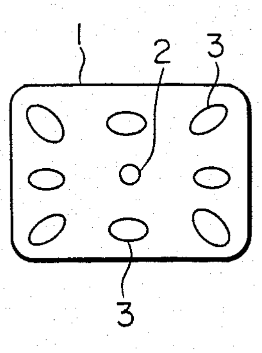
Figure 4B:
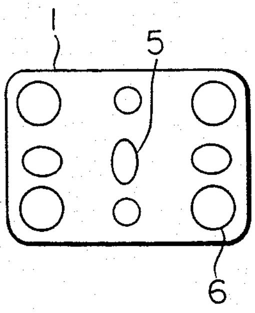
Figure 4C:
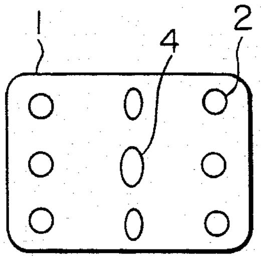
Figure 4D:
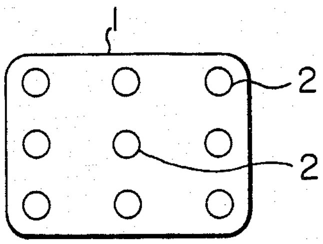
Figure 4E:
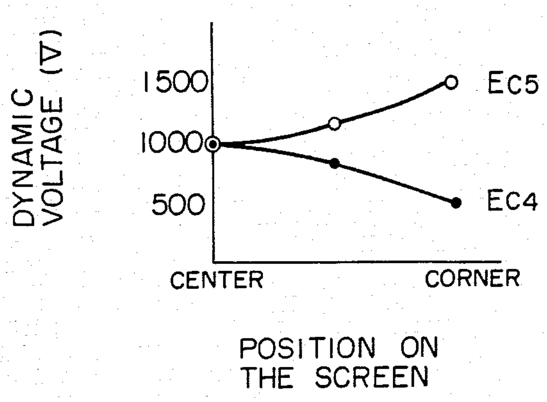

FIG. 3 shows another embodiment of the invention in which a connecting conductor 7 includes conductor segments 7A and 7B made of wire rods of substantially the same diameter and connected through a heavy connector 7D. When the connecting conductor 7 of this construction hangs downwardly of a lightning arrester, the conductor segment 7A is provided with a great bending strength by the heavy connector 7D and the only the conductor segment 7B is caused to swing by external forces. As a result, the same effect as the previously mentioned embodiment can be obtained.

Figure 5:
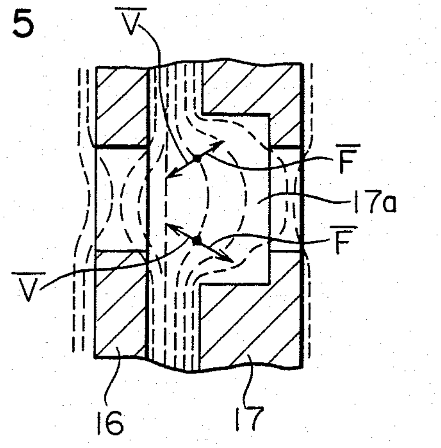

FIGS. 4 and 5 show still another embodiments of the invention. In these embodiments, a connecting conductor 7 includes two conductor segments 7A and 7B connected through a connector 7C as in the embodiment of FIG. 2. The conductor segment 7A connected to a supporting insulator 2 is made of a single small-gage wire rod and the conductor segment 7B connected to a lightning arrester 5 is made of two or three wire rods. Thus, the conductor segment 7B as a whole has an increased rigidity and an enhanced bending strength. With the connecting conductors 7 of these constructions, when the connecting conductor 7 is disconnected with the supporting insulator 2, only the conductor segment 7B is caused to swing by external forces. Thus, the required insulation distance L is ensured.

In the embodiment shown in FIG. 5, the conductor segment 7A made of three wire rods is attached to the lower end of the lightning arrester 5 by metal fixtures 9 and 10 thereby further increasing its bending strength.

We claim:

1. A connecting apparatus for an overhead transmission line lightning arrester comprising:

a connecting conductor attached to one end of a lightning arrester fastened at the other end thereof to an arm of a steel tower in juxtaposition with a supporting insulator attached at one end thereof to said arm thereby connecting said lightning arrester to the other end of said supporting insulator supporting an overhead transmission line thereat, said connecting conductor including at least two conductor segments having respectively given lengths and connected in series with each other, one of said conductor segments connected to said lightning arrester being greater in bending strength than the other of said conductor segments connected to said supporting insulator, said connecting conductor being connected to said supporting insulator through disconnecting means.

2. An apparatus according to claim 1, wherein said one conductor segment of said connecting conductor connected to said lightning arrester is made of a material having a large diameter, and said the other conductor segment connected to said supporting insulator is made of a material having a small diameter.

3. An apparatus according to claim 1, wherein said conductor segments of said connecting conductor are made of a material having a small diameter, and wherein a heavy object is connected between said conductor segments respectively connected to said supporting insulator and said lightning arrester.

4. An apparatus according to claim 1, wherein one of said conductor segments of said connecting conductor connected to said lightning arrester is made of a plurality of small-diameter materials and the other of said conductor segments connected to said supporting insulator is made of a small-diameter material.

5. An overhead transmission line system comprising:

a plurality of steel towers each having at least one arm;

a plurality of supporting insulators attached to one of said arms at one end thereof and supporting an overhead transmission line at the other end thereof;

disconnecting means connected to the other end of said supporting insulators to perform a disconnecting operation in response to a lightning current applied thereto;

a lightning arrester attached at one end thereof to each said arm in parallel to said supporting insulators attached thereto; and connecting means connected between the other end of each said lightning arrester and each said disconnecting means so as to be disconnected with said supporting insulators by each said disconnecting means in response to lightning, said connecting means including a first conductor segment having a large diameter and connected to each said lightning arrester, a second conductor segment connected to each said disconnecting means and smaller in diameter than said first conductor segment, and a connecting portion connecting said first and second conductor segments.

6. An overhead transmission line system comprising:

a plurality of steel towers each having at least one arm;

a plurality of supporting insulators attached at one end thereof to one of said arms and supporting an overhead transmission line at the other end thereof;

disconnecting means connected to the other end of said supporting insulators to perform a disconnecting operation in response to a lightning current applied thereto;

a lightning arrester attached at one end thereof to each said arm in parallel to said supporting insulators attached thereto; and connecting means connected between the other end of each said lightning arrester and each said disconnecting means so as to be disconnected with said supporting insulators by each said disconnecting means in response to lightning, said connecting means including a first conductor segment having a small diameter and connected to each said lightning arrester, a second conductor segment having the same diameter as said first conductor segment and connected to each said disconnecting means, and a connecting portion having a given weight and connecting said first and second conductor segments.

7. An overhead transmission line system comprising:

a plurality of steel towers each having at least one arm;

a plurality of supporting insulators attached at one end thereof to one of said arms and supporting an overhead transmission line at the other end thereof;

disconnecting means connected to the other end of said supporting insulators to perform a disconnecting operation in response to a lightning current applied thereto;

a lightning arrester attached at one end thereof to each said arm in parallel to said supporting insulators attached thereto; and connecting means connected between the other end of each said lightning arrester and each said disconnecting means so as to be disconnected with said supporting insulators by each said disconnecting means in response to lightning, said connecting means including a first conductor segment connected to each said lightning arrester and including two wires each having a small diameter, a second conductor segment connected to each said disconnecting means and including a single wire of the same diameter as the wires of said first conductor segment, and a connecting portion connecting said first and second conductor segments.

8. An overhead transmission line system comprising:

a plurality of steel towers each having at least one arm;

a plurality of supporting insulators attached at one end thereof to one of said arms and supporting an overhead transmission line at the other end thereof;

disconnecting means connected to the other end of said supporting insulators to perform a disconnecting operation in response to a lightning current applied thereto;

a lightning arrester attached at one end thereof to each said arm in parallel to said supporting insulators attached thereto; and connecting means connected between the other end of each said lightning arrester and each said disconnecting means so as to be disconnected with said supporting insulators by each said disconnecting means in response to lightning, said connecting means including a first conductor segment containing three wires having the same small diameter, two of said three wires being connected to a first attachment position of each said lightning arrester and the remaining one of said three wires being connected to a second attachment position of each said lightning arrester, a second conductor segment including a single wire of the same diameter as the wires of said first conductor segment, and a connecting portion connecting said first and second conductor segments.

9. An overhead transmission line system comprising:

a plurality of steel towers each having at least one arm;

a plurality of supporting insulators attached at one end thereof to one of said arms and supporting an overhead transmission line at the other end thereof;

disconnecting means connected to the other end of said supporting insulators to perform a disconnecting operation in response to a lightning current applied thereto; and a lightning arrester attached at one end thereof to each said arm in parallel to said supporting insulators attached thereto; and connecting means connected between the other end of each said lightning arrester and each said disconnecting means so as to be disconnected with said supporting insulators by each said disconnecting means in response to lightning, said connecting means including a first conductor segment having a first diameter and connected to each said lightning arrester, a second conductor segment having a second diameter smaller than the diameter of said first conductor segment, a first connecting portion for connecting said first and second conductor segments, a third conductor segment connected to each said disconnecting means and having a diameter smaller than the diameter of said second conductor segment, and a second connecting portion connecting said second and third conductor segments.

* * * * *